United States Patent [19]

Vollers

[11] Patent Number: 4,850,136
[45] Date of Patent: Jul. 25, 1989

[54] PLASTIC HORTICULTURAL BOX

[76] Inventor: Gary L. Vollers, 11471 Tampa Ave., Northridge, Calif. 91326

[21] Appl. No.: 95,947

[22] Filed: Sep. 14, 1987

[51] Int. Cl.⁴ .............................................. A01G 23/02
[52] U.S. Cl. ............................................. 47/73; 47/66
[58] Field of Search .................. 47/73, 25, 75, 76, 84, 47/66, 85, 74, 77; 111/2; 428/593

[56] References Cited

U.S. PATENT DOCUMENTS

| | | | |
|---|---|---|---|
| 1,031,713 | 7/1912 | Hills | 47/73 |
| 3,064,870 | 11/1962 | Dunlap et al. | 47/73 |
| 3,471,192 | 10/1969 | Childs et al. | 47/73 |
| 4,019,279 | 4/1977 | Moorman et al. | 47/25 |
| 4,649,667 | 3/1985 | Kitograd | 47/66 |
| 4,665,645 | 5/1987 | Schau et al. | 47/25 |
| 4,716,680 | 1/1988 | Whitcombe et al. | 47/73 |

FOREIGN PATENT DOCUMENTS 567293  2/1924  France ................................. 47/66

*Primary Examiner*—Robert A. Hafer
*Assistant Examiner*—Lynda M. Cofsky
*Attorney, Agent, or Firm*—William W. Haefliger

[57] ABSTRACT

In a demountable container, the combination comprising:
(a) the container having an upright axis and including multiple wall sections each extending part-way about said axis,
(b) the sections having laterally interfitting tongue and groove element connections,
(c) and elongated connectors extending through the tongue and groove elements so as to be endwise removable therefrom allowing separation of the sections.

7 Claims, 3 Drawing Sheets

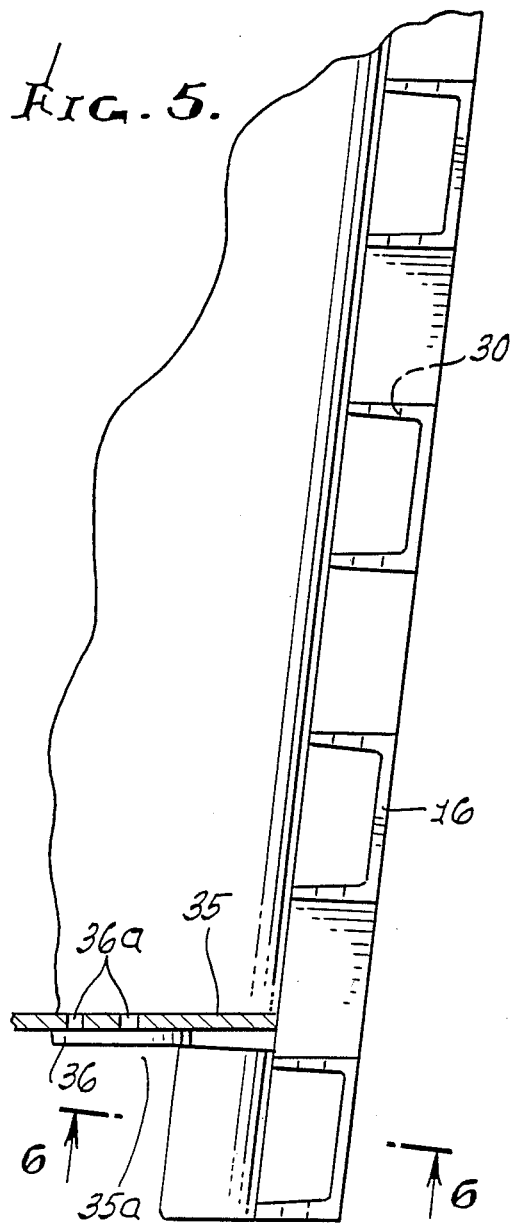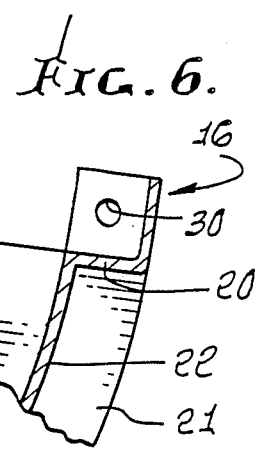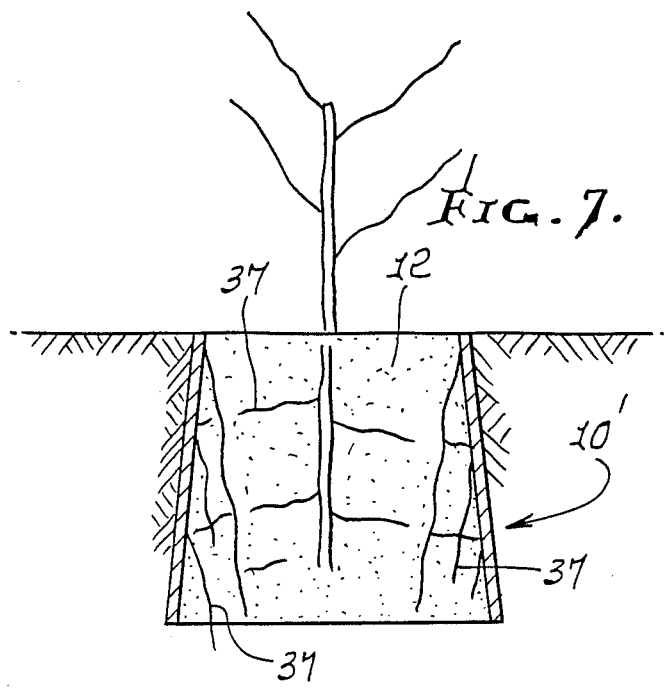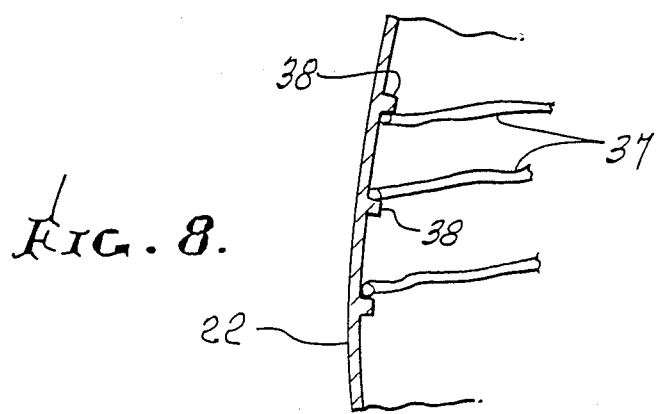

PLASTIC HORTICULTURAL BOX

BACKGROUND OF THE INVENTION

This invention relates generally to demountable containers, and more particularly to plastic containers that comprise sections that are easily separable, as from earth or earth-like material containing roots of growing trees, shrubs and the like.

At the present time large containers used by nurserymen for growing trees and shrubs are made of wood, i.e. wooden boxes. Disadvantages include the tendency of wood to rot over extended periods of time; structural failure of wooden boxes; and rusting or corroding of steel bands oftentimes wrapped about the wooden boxes to strengthen them. Also, the roots growing in the earth-like material tend to become excessively tangled, and to form clusters inhibiting desired outward growth into soil in which the root-mass is transplanted, after removal from wooden boxes. Further, such removal is made difficult by wooden box integral construction. There is need for an improved container construction, obviating the above problems and difficulties, and also providing low-cost containers, i.e. less expensive than wood.

SUMMARY OF THE INVENTION

It is a major object of the invention to provide an improved container which meets the above need, as well as incorporating numerous advantages in construction, as will appear. Basically, the demountable container of the invention is made of multiple, molded plastic, wall sections each extending part way about an upright axis defined by the assembled container structure; the sections have laterally interfitting tongue and groove elements enabling assembly of the sections into a complete wall of the container; and elongated connectors are provided to extend endwise through the tongue and groove elements to hold together the tongues of adjacent sections, the connectors being endwise removable to allow easy separation of the sections from one another, and away from the root structure in the earth-like material, at the transplanting site.

Typically, tongue elements on each section removably project clockwise laterally into recesses formed between counterclockwise laterally projecting tongue elements on an adjacent section; and the interfitting tongue elements form openings through which said elongated connectors project, endwise. As will be seen, four such sections of like construction may be employed, and the connectors may comprise rods, with flanges on their upper ends to limit rod insertion into the through openings molded into the tongues, whereby the flanges are easily grasped and pulled upward to remove the rods, allowing outward separation of the sections. Also, each section and the tongues thereon are typically of one-piece, molded plastic construction.

Additional features include provision of a bottom panel removably supported by the container, and spaced above the lowermost extent of each section; generally upright ribs on each section and facing the interior of the container, for directing root growth downwardly; and ledge means on the sections to support a bottom panel above the lowermost levels of the sections.

These and other objects and advantages of the invention, as well as the details of an illustrative embodiment, will be more fully understood from the following specification and drawings, in which:

DRAWING DESCRIPTION

FIG. 5 is an elevation taken on lines 5—5 of FIG. 3;

FIG. 6 is a section on lines 6—6 of FIG. 5;

FIG. 7 is a view showing use of the container in inverted position, to control root growth; and FIG. 8 is a section showing container ribs controlling root growth direction.

DETAILED DESCRIPTION

Figure 1:
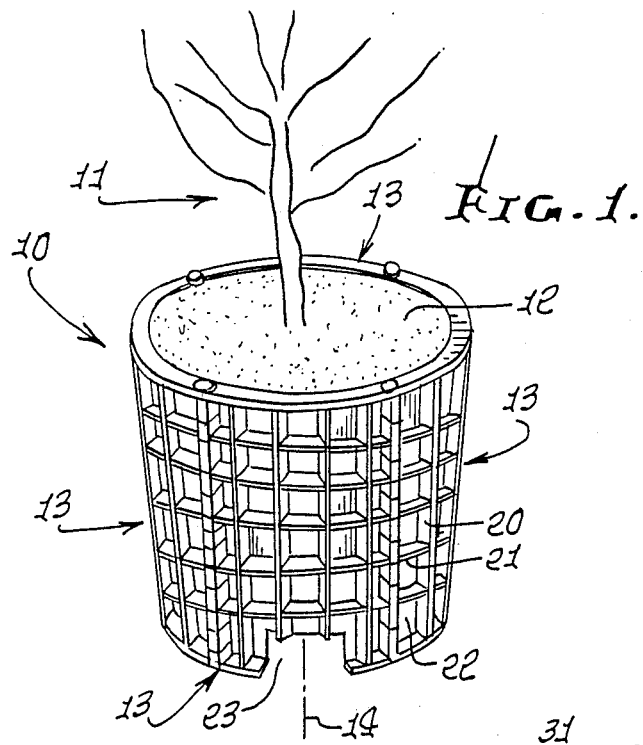
FIG. 1 is a perspective view of a container incorporating the invention.

In FIG. 1, the demountable container 10 of the invention is shown carrying a tree or shrub 11 growing upwardly from earth-like material 12 container root structure, and located in the container. Typically, the container may be 2–4 feet in diameter. The container itself comprises multiple like wall sections 13, each in the form of a sector of a frusto-conical annulus that tapers downwardly, as indicated. The vertical axis of the annulus is indicated at 14. Each wall section 13 extends part way about the axis 14, as for example 90° in the case of four sections, and the sections interfit, laterally, in demountable relation so that the sections can be easily removed laterally away from the earth-like material 12 at the time of planting of the tree, shrub or other vegetation growing from 12.

Figure 2A:
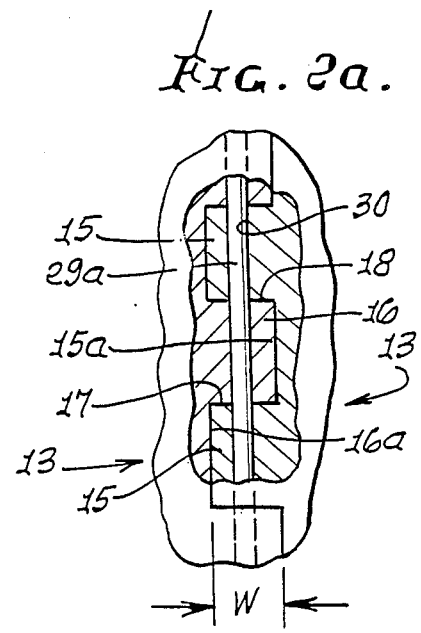
FIG. 2 is a fragmentary side view showing interfitting container section elements; and 2a is a schematic.
Figure 2:
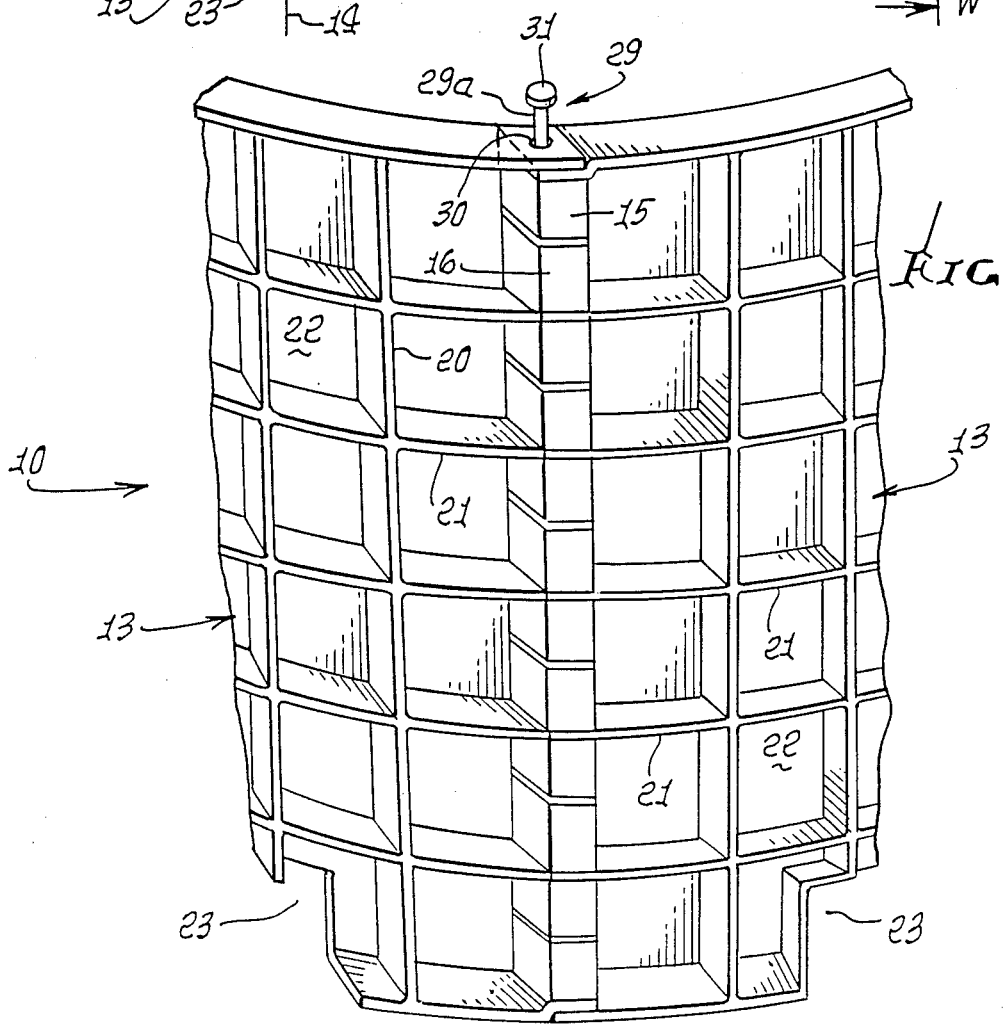
Figure 3:
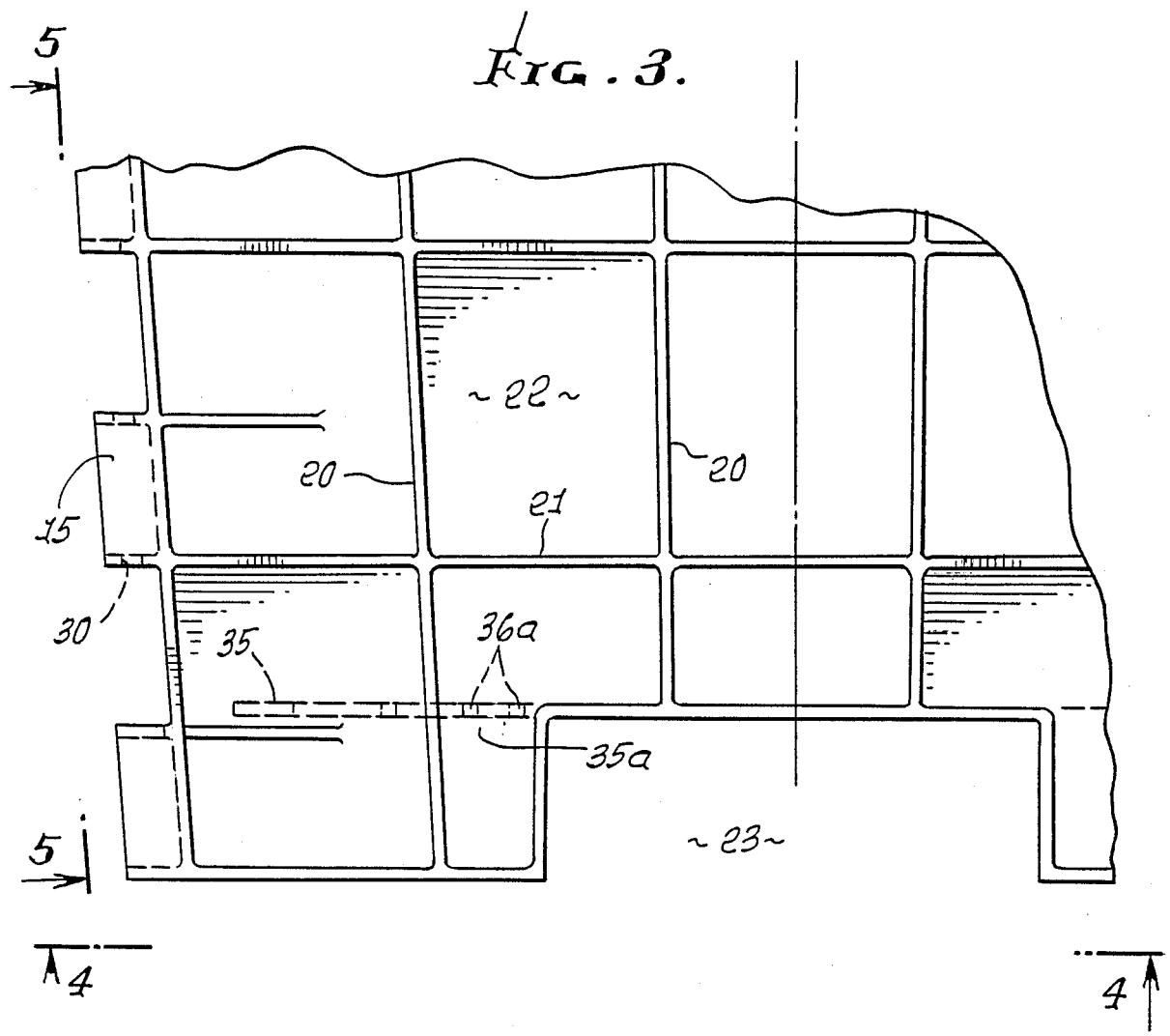
FIG. 3 is an elevation showing the exterior of one section of the container.
Figure 4:
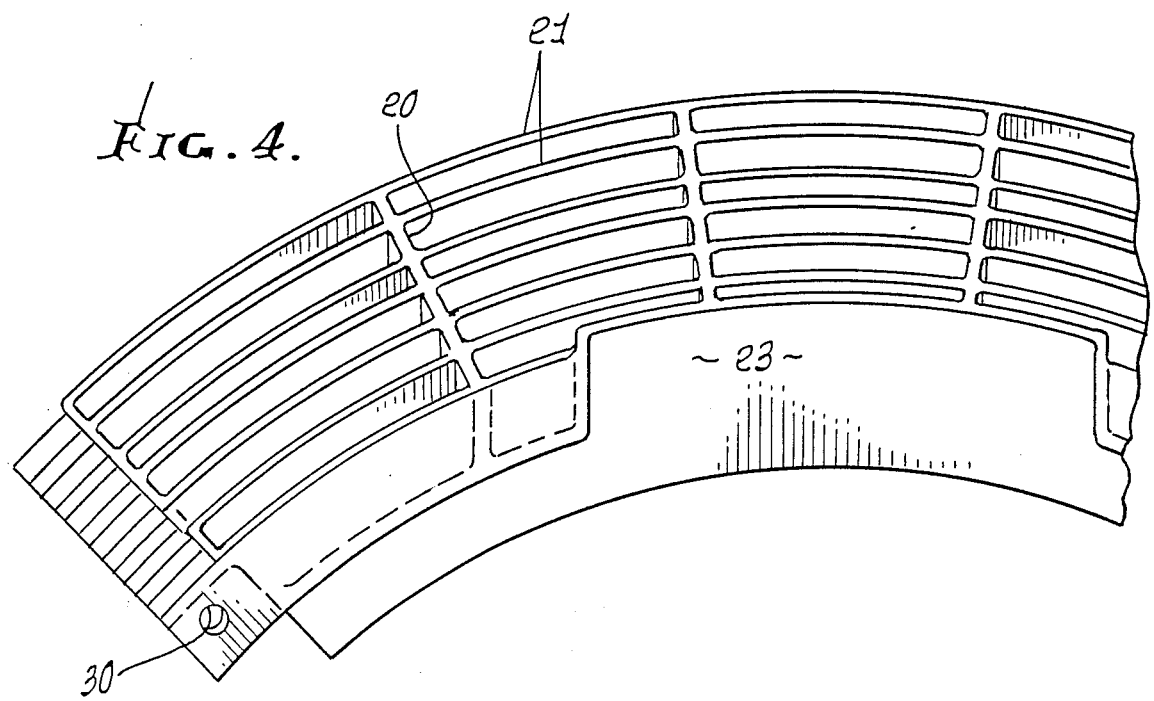
FIG. 4 is a bottom plan view taken on lines 4—4 of FIG. 3.

Extending the decription to FIG. 2, each section 13 has laterally clockwise extending tongues 15, which are generally vertically spaced apart in a row at one lateral edge 15a of the section; and each section also has laterally counterclockwise extending tongues 16, which are also generally vertically spaced apart in a row at the opposite lateral edge extent 16a of the section. See also FIG. 2a schematic.

Further, the tongues 15 form grooves 17 therebetween to closely laterally receive tongues 16; and the tongues 16 form grooves 18 therebetween,to closely laterally receive the tongues 15, in interfitting relation. Such interfit may advantageously be very close, and even slightly frictional over the width W of the section tongue to facilitate initial assembly of the sections to form a complete annular container wall.

The sections consist of molded synthetic resin foam such as the plastic material known as high-density polyethylene. Other plastic materials may be employed. Such materials overcome the disadvantages of wooden containers which tend to rot when wet (the tree or shrub roots normally being watered in the container), and which are not easily separated from the earth-like mass containing the tree roots. If metal bands are used about the wooden containers, they tend to corrode and rust. The container sections 13 of the present invention are structurally strengthened by vertical and horizontal ribs 20 and 21 projecting externally of walls 22; and these components 20–22 together with the tongues 15 and 16 are all integrally molded as a single section or unit. The lowermost extent of each wall 22 may advantageously define a laterally extending through recess 23 to laterally accept a container support, such as a fork of a pick-up truck or vehicle, for transporting the container and its vegetation onto or off a truck bed.

In accordance with a further and important feature of the invention, elongated connectors are provided to be extended through the interfitting tongue and groove elements, for holding them in assembled condition, the connectors being easily endwise removable from the tongues so as to allow quick demounting or separation of the assembled sections, as referred to above. As seen in FIG. 2, wherein one connector is shown partially elevated, the connector may take the form of a rod 29a receivable endwise downwardly in through holes or openings 30 molded into the tongues, in the direction of the row extent of the tongues. Flanges 31 at the tops of the rods limit their downward insertions into the holes, and also provide ready means for grasping the connectors, for endwise upward removal of the rods from openings 30, thereby allowing separation of the sections.

A bottom panel 35 is shown in FIG. 5, seated on ledges 36 defined by the sections 13 for retaining the earth-like mass in the container. It may be perforated at 36a to allow drainage of water from the container; and panel 35 is elevated to provide a drainage space 35a therebeneath so that water will readily drain from the container.

After separation of the sections from the root and earth-like mass 12, the latter may be planted in the earth, as indicated in FIG. 7. Also, the mass may be peripherally trimmed before planting to allow lateral enclosure by the re-formed and inverted container 10', also located in the ground. This combination then prevents root growth laterally beyond the container, at approximately ground surface level, so that tree roots do not lift sidewalk, concrete or other slabs. The roots 37 are, rather, intercepted by the container, and they then tend to grow downwardly, as shown. If upright internal ribs 38 are molded with the wall 22, they tend to intercept lateral root growth about the container axis, and to re-direct the roots to grow downwardly. See FIG. 8.

The outer surfaces of the sections are typically black, or near black, to ensure good absorption of radiant heat from the sun, for heat transfer to the root structure and retaining earth, for promoting growth.

Tongues 15 and 16 may be formed as flanged continuations of ribs 20, as shown.

I claim:

1. In a demountable container, the combination comprising:
    (a) the container being frusto-conical and having an upright axis and including at least three wall sections each extending part-way about said axis, each section including an inner wall and horizontally and vertically extending ribs integral with the wall and projecting outwardly therefrom, the horizontally extending ribs being vertically spaced,
    (b) the sections having laterally interfitting tongue and groove element connections, projecting outwardly from said inner walls and laterally beyond said horizontal ribs which extend circularly about said axis,
    (c) and elongated connectors extending through the tongue and groove elements so as to be endwise removable therefrom allowing separation of the sections,
    (d) tongue elements on each section removably projecting clockwise laterally into recesses formed between counterclockwise laterally projecting tongue elements on an adjacent section, at the outer side of said wall, said interfitting tongue elements forming openings through which said elongated connectors project, endwise, said openings formed at extensions of said horizontal ribs,
    (e) said interfitting tongue elements extending laterally in proximity to certain of said vertically extending ribs, and as lateral continuations of certain horizontal ribs,
    (f) the sections consisting of synthetic resin, each section including the tongue elements thereon being of one-piece molded construction,
    (g) said elongated connectors comprising rods,
    (h) said sections consisting of synthetic resin, each section including the tongues thereon being of one-piece molded construction,
    (i) there being a bottom panel removably supported by shoulders defined by sections of the container, and spaced above the lowermost extent of each section,
    (j) there also being generally upright ribs on each section and facing the interior of the container, for directing root growth downwardly,
    (k) and wherein at least one section of the container includes a side wall the lowermost extent of which defines a laterally extending recess to laterally accept a container support, below said removable bottom panel.

2. The combination of claim 1 wherein there are four of said sections.

3. The combination of claim 1 including earth-like material in the container and a plant, shrub or tree root structure in said material.

4. The combination of claim 3 wherein said container is buried in earth that surrounds the container.

5. The combination of claim 1 including flanges at the upper ends of the rods to limit rod insertion into said openings.

6. The combination of claim 1 including ledge means on the sections to support said bottom panel above the lowermost levels of the sections.

7. The combination of claim 1 wherein the container wall formed by said sections is frusto-conical, and the outer surfaces of the sections ar black, or near black, in color.

* * * * *